(12) United States Patent
Sen et al.

(10) Patent No.: US 9,383,797 B2
(45) Date of Patent: Jul. 5, 2016

(54) ELECTRONIC COMPUTER PROVIDING POWER/PERFORMANCE MANAGEMENT

(71) Applicant: Wisconsin Alumni Research Foundation, Madison, WI (US)

(72) Inventors: Rathijit Sen, Madison, WI (US); David A Wood, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 256 days.

(21) Appl. No.: 14/151,073

(22) Filed: Jan. 9, 2014

(65) Prior Publication Data

US 2015/0192980 A1     Jul. 9, 2015

(51) Int. Cl.
*G06F 1/32* (2006.01)
*G06F 9/50* (2006.01)

(52) U.S. Cl.
CPC .............. *G06F 1/3203* (2013.01); *G06F 1/329* (2013.01); *G06F 9/5094* (2013.01); *Y02B 60/144* (2013.01)

(58) Field of Classification Search
CPC ... G06F 1/3206; G06F 1/3234; G06F 1/3203; G06F 1/329; G06F 9/5094; Y02B 60/144
See application file for complete search history.

(56) References Cited

U.S. PATENT DOCUMENTS

| 8,510,582 | B2 * | 8/2013 | Naffziger | G06F 1/3206 713/323 |
| 8,850,172 | B2 * | 9/2014 | Dietrich | G06F 11/3442 713/1 |
| 8,959,371 | B2 * | 2/2015 | Tran | G06F 1/3206 712/15 |
| 2008/0307240 | A1 * | 12/2008 | Dahan | G06F 1/06 713/320 |

OTHER PUBLICATIONS

Canturk Isci et al; An Analysis of Efficient Multi-Core Global Power Management Policies: Maximizing Performance for a Given Power Budget; The 39th Annual IEEE/ACM International Symposium on Microarchitecture; Micro 2006; pp. 347-358; IEEE Computer Society; US.

Qingyuan Deng et al; CoScale Coordinating CPU and Memory System DVFS in Server Systems; Microarchitecture (MICRO), 2012 45th Annual IEEE/ACM International Symposium; pp. 143-154; Conference Location, Vancouver, BC.

Sanjeev Jahagirdar et al; Power Management of the Third Generation Intel Core Micro Architecture formerly codenamed Ivy Bridge; Power Point; Intel Leap Ahead, Ivy Bridge—Hot Chips 2012; Intel Corporation;Entire Document, US.

* cited by examiner

*Primary Examiner* — Thuan Du
(74) *Attorney, Agent, or Firm* — Boyle Fredrickson, S.C.

(57) ABSTRACT

Computational resources of an electronic computer are monitored by predictors that establish predicted trade-offs between performance and power for a particular workload while the workload is being executed. A coordinator combines prediction values to identify a limited number of combinations of operating states of the computational resources, allowing operating states of the computational resources to be readily adapted during program execution based on a particular workload. The limited number of combinations of operating states are ideally Pareto optimal combinations.

16 Claims, 3 Drawing Sheets

ELECTRONIC COMPUTER PROVIDING POWER/PERFORMANCE MANAGEMENT

STATEMENT REGARDING FEDERALLY SPONSORED RESEARCH OR DEVELOPMENT

This invention was made with government support under 1017650, 1117280 and 1218323 awarded by the National Science Foundation. The government has certain rights in the invention

BACKGROUND OF THE INVENTION

The present invention relates to computer systems in which components may be adjusted to change electrical power consumption and performance, and in particular to a computer architecture that exposes information about electrical power consumption and performance responsive for different operating states under particular workloads to allow energy/performance informed adjustment of the components under varying workloads.

Electrical power consumption is a significant constraint in electronic computer design and use. These constraints result both from a need to conserve power (to save power costs for data centers and to prolong the operating life of battery-operated devices) and the need to manage heat dissipation in devices with increasing transistor density.

Modern processors provide the ability to adjust the operating states of their component computational resources to vary the trade-off between energy consumption and computational performance. For example, the operating voltage and/or clock frequency of the processor may be lowered to reduce the processor energy consumption with a corresponding decrease in processor execution speed. Similar adjustments may be made in cache sizes, memory access speeds, and data communication channels within the computer system to change the relative performance/energy consumption.

While each of these adjustments in operating state tend to change the performance/energy consumption in a predictable direction, the interaction of the adjustments can be unexpected and the actual impact on overall system performance and energy consumption is not quantified. For this reason, precise adjustment of the electronic computer to a particular power limit or performance standard is not possible.

SUMMARY OF THE INVENTION

It is generally difficult to assess the actual energy consumption and performance of an electronic computer at different operating states of its components for three reasons: (1) there are extremely large numbers of different combinations of operating states; (2) the operating states of the different components interact with each other in their effect on overall energy consumption and performance; and (3) the energy consumption and performance of an electronic computer in a given operating state will depend significantly on the type of program being executed, something that varies over time.

Accordingly, the present invention provides a set of predictors offering runtime monitoring of the energy consumption and performance of individual components of the electronic computer at a given operating state and in predictions for other operating states. These predictions are combined in a system model to develop a set of energy consumption/performance settings for the particular workload. In one embodiment only Pareto optimal settings (with respect to energy consumption and performance) are developed to simplify adjustment of the computer system during runtime.

Specifically then, the present invention provides an electronic computer having a set of computational resources working together to execute a stored computer program, each resource capable of operating in a set of different states providing different combinations of electrical power consumption and speed of execution of a portion of a stored computer program. Predictors are associated with each computational resource for monitoring the computational resource during the execution of the stored computer program to generate resource predictions describing electrical power consumption and speed of execution of a portion of the stored computer program at the different states of the computational resource. A coordinator receives the resource predictions from the predictors to: (1) combine the resource predictions into system predictions describing electrical power consumption and speed of execution of the stored computer program by the computational resources at different states working together, and to: (2) output at least selected system predictions and associated states of the computational resources.

It is thus a feature of at least one embodiment of the invention to provide actual data about power consumption and speed of execution with a given workload allowing sophisticated power/performance management.

The output system predictions may be Pareto optimal predictions with respect to electrical power consumption and speed of execution of the electronic computer.

It is thus a feature of at least one embodiment of the invention to provide a reduced set of useful operating state combinations allowing efficient runtime management by selecting among this reduced set. It is a further feature of at least one embodiment of the invention to permit optimal state combinations to be achieved, such as may not be possible with simple "hill-climb" type approaches or practical with trial and error approaches.

The predictors may provide resource predictions and the coordinator may repeat steps (1)-(2) at multiple intervals during execution of the stored computer program.

It is thus a feature of at least one embodiment of the invention to provide for power/performance management that accurately reflects current workload conditions in a changing computational environment.

The output may be communicated to display for viewing by a user for entry of a selection of step (2).

It is thus a feature of at least one embodiment of the invention to provide a tool useful for a user or administrator to realize particular performance or energy consumption goals.

The electronic computer may further accept a selection among the output associated with a combination of different states to control the computational resources to adopt the selected combination of different states.

It is thus a feature of at least one embodiment of the invention to provide a mechanism for setting multiple operating states of different computational resources to obtain a desired energy consumption/performance outcome by selecting the desired energy consumption/performance outcome.

In one embodiment, the coordinator may further receive a desired operating condition of at least one of electrical power consumption and speed of execution of the stored program and evaluate the output selected system predictions and associated combinations of different states against the desired operating condition to provide the selection among the associated states of the selected system predictions.

It is thus a feature of at least one embodiment of the invention to permit automatic adjustment of operating states of the components of an electronic computer to conform to the desired goal described by energy, performance or a combination thereof.

The computational resources may include: (1) at least one memory cache and the different states provide different operating sizes of memory cache; (2) at least one processor and the different states provide at least one of different processor voltages and different processor clock frequencies to the processor, (3) at least one communication channel between computational resources and the different states provide different numbers of parallel serial communication channels between given computational resources; and (4) non-cache memory wherein the different states provide at least one of memory voltage supply and memory clock speed provided to the non-cache memory.

It is also a feature of at least one embodiment of the invention to provide a system that may work with a variety of different computational resources making up an electronic computer.

The coordinator may combine the resource predictions using a model of interaction between the computational resources reflecting an effect on speed of execution for any given computational resource on a speed of execution of a different computational resource.

It is thus a feature of at least one embodiment of the invention to provide a sophisticated prediction of energy consumption and performance that reflects the interdependence between computational resources.

The electronic computer may be a multicore processor and the coordinator may be a program stored in non-transient media executing on a core. The coordinator may choose to parallelize its computation using multiple cores.

It is thus a feature of at least one embodiment of the invention to minimize the need for specialized hardware in implementing the present invention by allowing the coordinator to be implemented on a core.

The computational resources may be elements of multiple different processors.

It is thus a feature of at least one embodiment of the invention to provide the present invention to work across multiple electronic processors.

The predictors may be nonintrusive to generate resource predictions without modification of the execution of the stored program.

It is thus a feature of at least one embodiment of the invention to minimize the performance impact of the present invention.

These particular objects and advantages may apply to only some embodiments falling within the claims and thus do not define the scope of the invention.

These particular objects and advantages may apply to only some embodiments falling within the claims and thus do not define the scope of the invention.

DETAILED DESCRIPTION OF THE PREFERRED EMBODIMENT

Operating Hardware

Figures 1, 2:
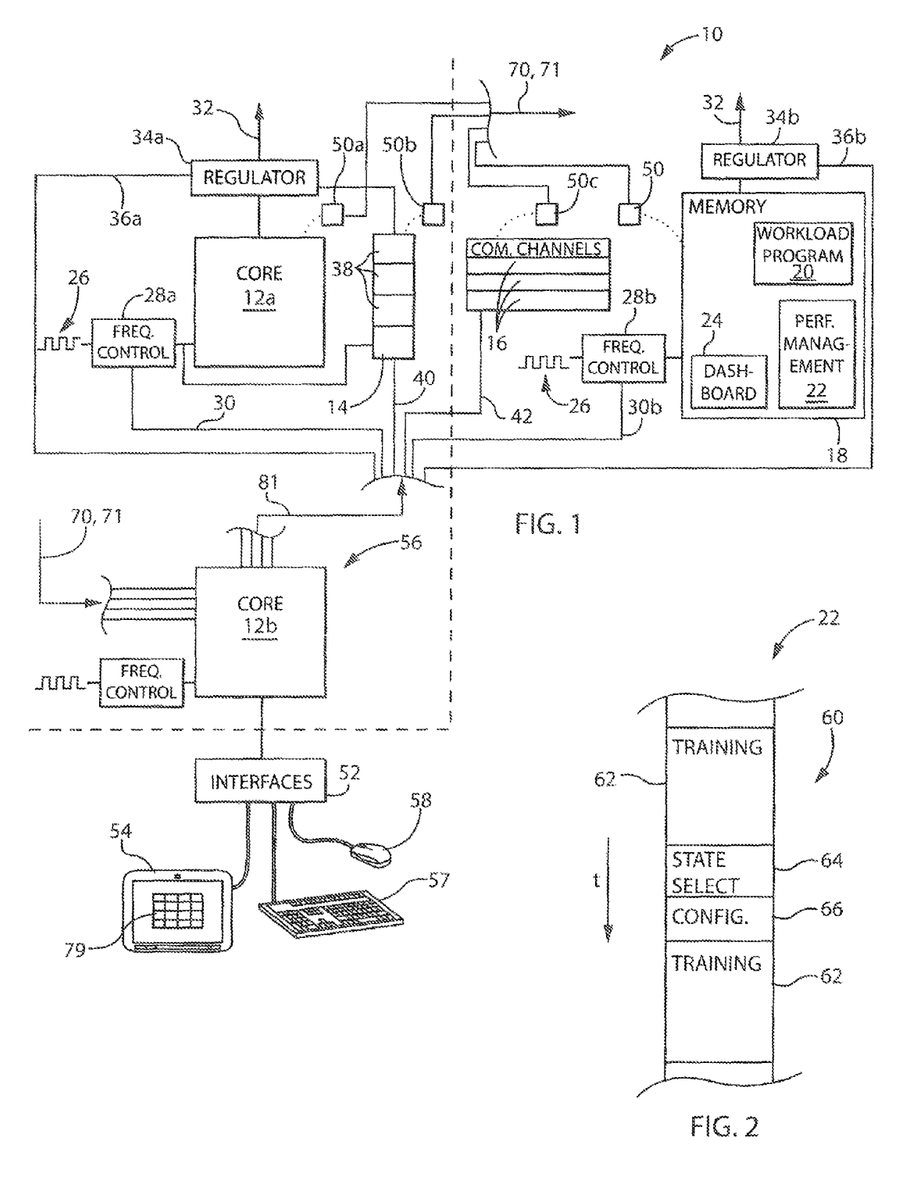
FIG. 1 is a simplified block diagram of portions of a multicore processor system suitable for use with the present invention including multiple computational resources of a processor, a cache, a main memory, and memory communication channels, each communicating with a predictor which provides data to a coordinator executing on one or more processor cores.
FIG. 2 is a graphic representation of a time sequence of steps of training and steps of reconfiguring the computational resources during execution of the stored program.

Referring now to FIG. 1, an electronic computer 10 may provide, for example, multiple processing cores 12a and 12b each including transistor circuitry for the implementation of a standard processor including an arithmetic logic unit, associated registers and allied computational circuits as is generally understood in the art.

Each processing core 12 may communicate with one or more memory caches 14 (one shown for clarity) which in turn communicate through one or more memory communication channels 16 with the main memory 18.

The main memory 18 provides a non-transitory storage of programs including a workload program 20 for execution on the core 12a and a performance management program 22 of the present invention as will be described below. Memory 18 may also include various data stores including a dashboard output 24 as will be described below and various lookup tables used to hold performance profiles, state descriptions and other data as used in the present invention.

As is generally understood in the art, each core 12 receives a clock signal 26 permitting synchronous operation of the circuitry in the core 12. The clock signal 26 may pass through a frequency controller circuit 28a before being received by the core 12, the frequency controller circuit 28a multiplying or dividing the frequency of the clock signal 26 before it is received by the core 12. Frequency controller circuit 28a may be a phase lock loop frequency divider, of a type well known in the art, or a state-machine type frequency divider (e.g. a counter) and may receive a clock state signal 30a selecting among several different clock frequencies to provide a clock signal to the core 12a. The clock state signal 30a may be provided by core 12b acting as a coordinator 56 as will be discussed below.

Generally the frequency controller circuit 28a also provides a clock frequency to the cache 14 so that both the core 12 and cache 14 operate in synchrony.

Each core 12 may also receive a supply voltage 32 through a voltage regulator 34a that may receive a supply voltage state signal 36a (also controllable by coordinator 56) that determines the actual voltage applied to the cores 12a selected from a number of discrete voltage levels.

The power dissipation or energy consumption of the core 12a, as will be understood in the art, can be decreased by decreasing the core clock speed by frequency controller circuit 28a and/or by decreasing the core voltage by voltage regulator 34a. This reduction in power dissipation is accompanied with a falloff in the performance of the core 12 measured, for example, in the number of instructions executed per second.

Generally changes in the frequency and voltage applied to the core 12a will be coordinated to produce a number of discrete steps of dynamic voltage and frequency scaling (DVFS) each providing a different operating state for the core 12a designated for the purpose of the example of this application as P0, P1, P2, P3, P4, P5, P6, P7, and P8. A similar voltage and frequency scaling can optionally be applied to the cache 14 so that they operate in the same voltage and frequency domain.

The cache 14 provides local memory storage that may be partitioned into cache sections 38 each separately controllable by cache state signal 40 (from coordinator 56) to turn a particular cache section 38 on or off. Turning off a cache section 38 saves power but will typically slow the performance of the computer 10 by provoking increased cache misses and hence the need for additional reads and writebacks to memory 18. Although only four cache sections 38 are shown for clarity, for the purpose of the example of this application, the cache 14 may be controlled to five states as C0, C1, C2, C3, and C4 each representing the activation of a different number or combination of cache sections 38.

In a similar manner, each memory communication channel comprises a set of parallel-connected, serializer/deserializer interface pairs 16 (SERDES pairs) which can be switched on and off through serial connect state signal 42 (from coordinator 56) so that a greater or fewer number of parallel-connected SERDES pairs 16 are available for data transfer between the cache 14 and the memory 18. Again, decreasing the number of SERDES pairs 16 decreases power usage but may slow the performance of the computer 10 by decreasing the bandwidth for communication and thus requiring greater communication time. The present example will assume that the memory communication channel can be controlled to six states as S0, S1, S2, S3, S4, and S5 each representing a different number or combination of SERDES pairs 16.

The memory 18, like the cores, 12 may receive a clock signal 26 that passes through a frequency controller circuit 28b (controlled by clock state signal 30b from coordinator 56) before being received by the memory 18 and a supply voltage 32 passing through voltage regulator 34b (controlled by supply voltage state signal 36b from coordinator 56). As is the case with the core 12, reduced operating voltage and reduced clock speed reduce the energy consumed by the memory 18 but reduce its speed of operation in terms of providing access to the data stored in the memory 18. In the present example, there can be three control states: M0, M1, M2.

It will generally be appreciated that each of the different operating states of the above, for computational resources of the core 12a, the cache 14, the SERDES pairs 16 and the memory 18, result in 810 different possible operating system combinations for the electronic computer 10.

Referring still to FIG. 1, each of the computational resources of the core 12a, the cache 14, the SERDES pairs 16 and the memory 18 may be associated with a predictor 50a, 50b, 50c, or 50d, respectively, that will serve to monitor the operation of the respective computational resource and to predict how performance and energy consumption vary with different operating states under a particular workload of executing workload program 20.

Finally, the computer 10 may include one or more interfaces 52 communicating with various user control devices such as the display screen 54, keyboard 57, and a cursor control device such as a mouse 58.

The communication between the core 12b operating as a coordinator 56 and each of the state signals 30, 36, 40, and 42 may, but need not be, implemented by direct communication lines as shown but may be implemented by a variety of other means including memory or I/O mapped registers or the like.

Operation

Referring now to FIGS. 1 and 2, generally the predictors 50 communicate with the coordinator 56 to provide operating predictions to the coordinator 56 indicating the energy consumption and performance of the particular computational resource at a variety of different operating states for the current workload. The coordinator 56 may then control the computational resources through the state signals 30a, 36a, 30b, 36b, 40, and 42 based on those predictions.

As shown in FIG. 2, this process involves repeated execution of three states 60 during execution by core 12 of the workload program 20, the states 60 including: a training state 62, a state selection state 64, and a configuration state 66. During the training state 62, the predictors 50 monitor their respective computational resources to evaluate the relative trade-offs in performance and power under the historical operating environment of executing a workload program 20. In the state selection state 64, Pareto optimal combination states (representing particular combinations of operating states of each computational resource) are determined by the coordinator 56 and output to a user or control program, and in state 66 a desired state configuration selected from among the output Pareto optimal combination states is transmitted to the computational resources through the state signals 30a. 36a, 30b, 36b, 40, and 42.

Figure 3:
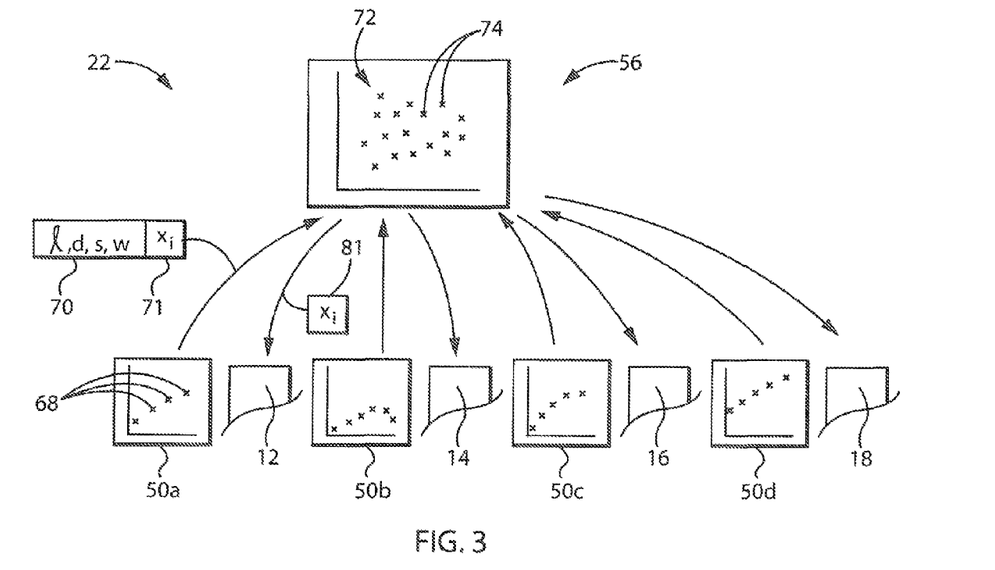
FIG. 3 is a graphic representation of the communication of predictions and the state of descriptions from the predictors to the coordinator for population of a computational resource state space reflecting power and performance for a different combination of operating states.

Referring now to FIG. 3, each of the predictors 50 operates to analyze the local runtime relationship between power usage and performance for its different operating state described above. The result will generally describe a performance/energy descriptor for each possible state as may be described by a set of points 68 for each state shown plotted along the axes of electrical power usage versus performance for that state.

The predictors 50 are preferably "noninvasive" meaning that they observe the operation of the associated computational resource with execution of the specific workload program 20 without injecting test data into the computational resource, although the present invention does not exclude this possibility. Generally, by observation of the operation of the computational resource in executing the workload program 20, the predictor 50 can determine how the operation would change locally with changes to different states around the current operating point.

More specifically, for each state of a computational resource p, an energy consumption/performance prediction 70 may be generated. The energy consumption/performance prediction 70 may be a four-tuple of data transmitted from the predictor 50 to the coordinator 56 together with an identification of the associated operating state 71.

In one example this energy consumption/performance prediction 70 is $(l_i(p), d_i(P), s_i(p), w_i(p))$ where:

$l_i(p)$ is the relative slowdown (i.e. new time/baseline time) by computational resource p, for its own operations. In this context, the "time" or t(p) of the "new time" or "baseline time" of this calculation is the estimated non-overlapped contribution to system execution time by the computational resource p, something that has different meanings for different computational resources. The estimated contributions are such that the sum of t(p) values equals the system execution time, t(sys). The baseline t(p) values may be determined using online regression analysis and resource access latencies that may be measured with simple hardware performance counters. For example, the estimation of baseline contributions by "on-chip" and "off-chip" resources to t(sys) may be deduced using online regression analysis between cache miss rates and execution time per instruction or using empirically determined coefficients. Further division of contributions by constituent resources may be done in proportion to their average processing latencies. For the processor 12a, t(p) may depend on the average time taken by the processor computational logic to execute instructions. For the cache 14, t(p) may depend on the time the cache 14 takes to respond to a cache access.

For the SERDES pairs 16, t(p) will depend on the time of transferring data along the channel as may be determined by a formula as described below, and for the memory 18, t(p) may depend on the time for accessing the memory when a memory access request is obtained, being a relatively simple function of the clock speed also described below. Generally these latter two time values may be further scaled by the predicted cache misses of the cache 14 to reflect the time for write-backs.

The term $d_i(p)$ in the energy consumption/performance prediction 70 is the dynamic power predicted to be used by computational resource p (the component of power that fluctuates depending on the workload) and execution time.

$s_i(p)$ is the static power predicted to be used by computational resource p (that is, power that is essentially independent of the actual workload).

$w_i(p)$ is a vector of work request summaries generated by the computational resource p that depend on the particular computational resource. For example, the cache 14 may provide a work request summary indicating the number of memory reads and the number of write-backs in the particular state that may inform the calculation of $l_i(p)$ for the SERDES pairs 16 and memory 18.

Together, $l_i(p)$ and $w_i(p)$ generally describe the performance associated with each operating state of the computational resource p, and $d_i(p)$ and $s_i(p)$ describe the power consumed by that computational resource p for the given workload and designated operating state of the computational resource. Additional meta-data such as transition cost and confidence of the predictions may be included in the energy consumption/performance prediction 70, thereby increasing the arity of the tuples of data transmitted.

By and large these energy consumption/performance predictions 70 of the different computational resources are independent and thus do not predict interaction between the different computational resources that would occur in the actual electronic computer 10. This interaction may be accommodated by subsequent modeling by the coordinator 56. Alternatively or in addition, the predictors 50 may model some interaction, for example, with respect to write-backs as described above. For example, the energy consumption of the SERDES pairs 16 and memory 18 may be adjusted to rise with increasing number of cache misses of cache 14. Likewise the energy costs associated with the core 12 may be increased because of additional queuing time resulting from a slowdown of the system as a whole. These adjustments will be described below in example predictors.

In one embodiment of the predictors 50, the computational resources associated with each predictor 50 may be divided loosely into categories of "on-chip" computational resources including the processing cores 12 and the cache 14 and "off-chip" computational resources including the SERDES pairs 16 and the memory 18. These categorizations are not intended to be limiting with respect to the invention.

For the on-chip computational resources, the performance using only DVFS is generally considered to be proportional to the received clock signal from frequency controller circuit 28a, and power consumption is modeled based on clock frequency and assumes a known, proportional change in operating voltage. For the cache 14, a measured cache miss-rate is used to deduce the ratio of memory reads to write-backs of the work request summary.

As one example, the on chip computational resources of the core 12 and cache 14 have 9 P and 5 C states, to produce 9×5=45 (on chip) combination states. Using published data for voltage-frequency controls for a commercial microprocessor (Pentium M), an assumption may be made that that the voltage supplied to the processor will be decreased as the frequency is decreased. For example, every 200 MHz change in frequency may be accompanied by a 50 mV change in voltage. In this case, $V_{new}=V_{cur}+50$ mV$((f_{new}-f_{cur})/200$ MHz$)$ and let $\gamma=f_{new}/f_{cur}$. As used herein, subscripts "new" and "cur" represent new (or predicted) and current (or baseline) values of the respective variables upon a change of state from a current state to a new state.

In this case, $l_{new}=1/\gamma$. Thus, in one example, the predictor 50 may assume that a on chip contribution to execution time is inversely proportional to frequency.

With respect to predicted dynamic power for the state, $d_{new}=d_{cur}(V_{new}/V_{cur})^2\gamma$. This uses the intuition that dynamic energy is proportional to $V^2f$. This predictor ignores changes in dynamic energy for cache replacements and determines the energy necessary for each cache section 38 from published values (CACTI).

Static power may be calculated as $s_{new}=s(CPU)+s(LLC)+\Delta s_v+\Delta s_T$ where $\Delta s_v$ and $\Delta s_T$, respectively, denote the effect of voltage and temperature on static power. In this example, $\Delta s_v$ and $\Delta s_T$ may be considered for only high clock frequencies (for example frequencies above a midrange clock frequency) and a linear scaling may be assumed for $\Delta s_v$ and a 3° C. increase in temperature by every 200 MHz for the purpose of calculating $\Delta s_T$. Published values (CACTI) may be used for s(CPU), s(LLC) and linear interpolation used to determine $\Delta s_T$. See generally, Naveen Muralimanohar, Rajeev Balasubramanian, Norman P. Jouppi: Architecting Efficient Interconnects for Large Caches with CACTI 6.0. IEEE Micro 28(1): 69-79 (2008)

Finally, $w_{new}$ is obtained using an online cache miss-rate predictor and assumes that the ratio of memory reads to writebacks remains the same across configurations.

For the off chip computational resources of the SERDES pairs 16 and memory 18 performance is generally considered to be proportional to the sum of the delay of the SERDES pairs 16 and memory 18. In an example where the memory 18 is a Hybrid Memory Queue (described generally at J. T. Pawlowski, "Hybrid Memory Cube (HMC)," in Hot Chips 23, 2011, hereby incorporated by reference) power consumption is again model-based on clock frequency and assumes corresponding changes in operating voltage.

For example, with the off chip computational resources of the SERDES pairs 16 and memory 18 having 6 S and 3 M states, this subsystem generates 6×3=18 off-chip states.

In this case, $l_{new}$=(SERDES_delay+HMC_delay)/(current_offchip_delay)
where SERDES_delay=$(2\mu-\lambda)/(2\mu(\mu-\lambda))$ (standard M/D/1 model) where $\mu$ is the service rate (Table I, 1 roundtrip transaction in 6-flit-time+expected inter-quadrant delay) and $\lambda$ is the arrival rate (affected by on chip w and l(sys)). HMC_delay, in this example, is assumed to be 28.44 ns/$\gamma$ where $\gamma=f_{new}/f_{cur}$(1.0, 1.1 or 1.2). This assumes that memory queuing delays are negligible due to the high parallelism offered by the HMC. All delays are normalized so that $l_{new}=1$ when $l_{sys}=1$ for the current configuration.

TABLE I

| Config. | Bandwidth | | Rd req | | Wr req | | Rd resp | | Wr resp | | Pwr |
|---|---|---|---|---|---|---|---|---|---|---|---|
| | Lanes | GB/s | Flits | Ns | Flits | Ns | Flits | Ns | Flits | Ns | W |
| Full(F) | 16 × 2 | 50.0 | 1 | 0.64 | 5 | 3.2 | 5 | 3.2 | 1 | 0.64 | 0.8 |
| Half(H) | 8 × 2 | 25.0 | 1 | 1.28 | 5 | 6.4 | 5 | 6.4 | 1 | 1.28 | 0.4 |
| Quarter(Q) | 4 × 2 | 12.5 | 1 | 2.56 | 5 | 12.8 | 5 | 12.8 | 1 | 2.56 | 0.2 |
| None(N) | 0 | 0 | 1 | ∞ | 5 | ∞ | 5 | ∞ | 1 | ∞ | 0 |

Static power is determined by $s_{new}=s(\text{SERDES})+s(\text{HMC})$ where s(SERDES) is obtained from Table I and s(HMC) =current HMC refresh power×$\gamma^2$.

Dynamic power is determined by $d_{new}=(\#\text{reads}+\#\text{writes})\times$ current HMC energy/access×$\gamma^2$+current HMC background energy×$\gamma^2$.

Finally, $w_{new}$ is not set (no further requests generated).

Referring still to FIG. 3, the coordinator 56, receiving the energy consumption/performance prediction 70, generates a set of possible state combinations 74 representing each combination of energy consumption/performance predictions 70 from the different computational resources whose energy consumption and performance is deduced as follows:

$$l(\text{sys})=\Sigma_p t(p)l(p)/\Sigma_p t(p)$$

$$d(\text{sys})=\Sigma_p d(p)$$

$$s(\text{sys})=\Sigma_p s(p)$$

w(sys) is not used in this example but would be used if a particular electronic computer 10 provided work requests for other cores 12 in a cluster or the like.

The coordinator may work with predictors other than those described in this example that represent various choices in tradeoffs between implementation costs and prediction accuracy.

Each of these state combinations 74 represents a different combination of the energy consumption/performance prediction 70 and may be plotted as points along the axes of electrical power usage versus performance for that state to generate a cloud 72 of state combinations 74 over a range of different power usages and performances. Generally, larger values of l(sys) map to decreased performance and smaller values of d(sys) and s(sys) map to reduced power consumption.

Figure 4:
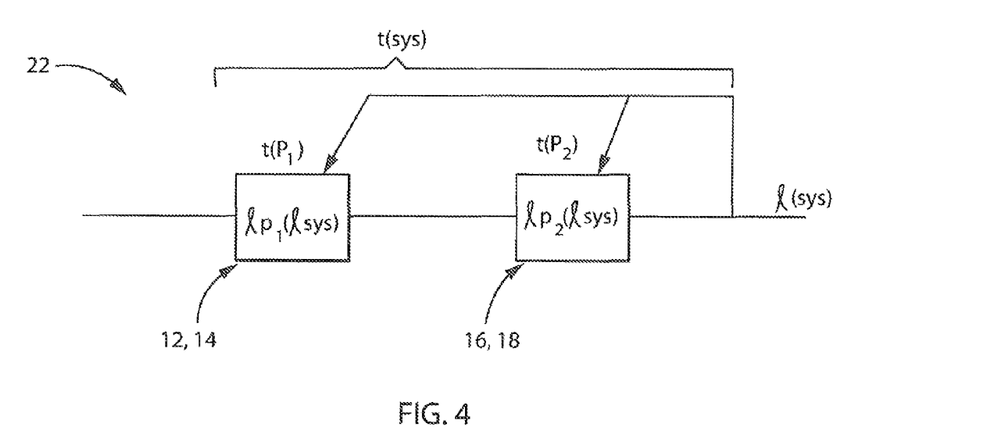
FIG. 4 is a block diagram of a model implemented by the coordinator in combining the predictions and state descriptions from the predictors into the state space.

As noted above, the values of l(p) may be a function of l(sys) and, accordingly, the coordinator 56 may implement a feedback model shown generally in FIG. 4 in order to solve for values of l(sys). As depicted in FIG. 4, each computational resource 12, 14, 16, and 18, for any given state may have a value of l(p) and t(p) that contributes to an overall value of l(sys) and overall time t(sys). This model may be solved, for example, by creating a closed functional form (e.g. a polynomial) of the equations and using conventional solving algorithms. Such approaches can be complex, however, and may involve substantial and nontrivial computation costs. Accordingly, the l(p) may be determined iteratively by incrementally changing the arguments until convergence occurs within a predetermined accuracy. By constraining the relationship between l(p) and l(sys) to be monotonically decreasing, convergence on a unique solution is ensured.

Figure 5:
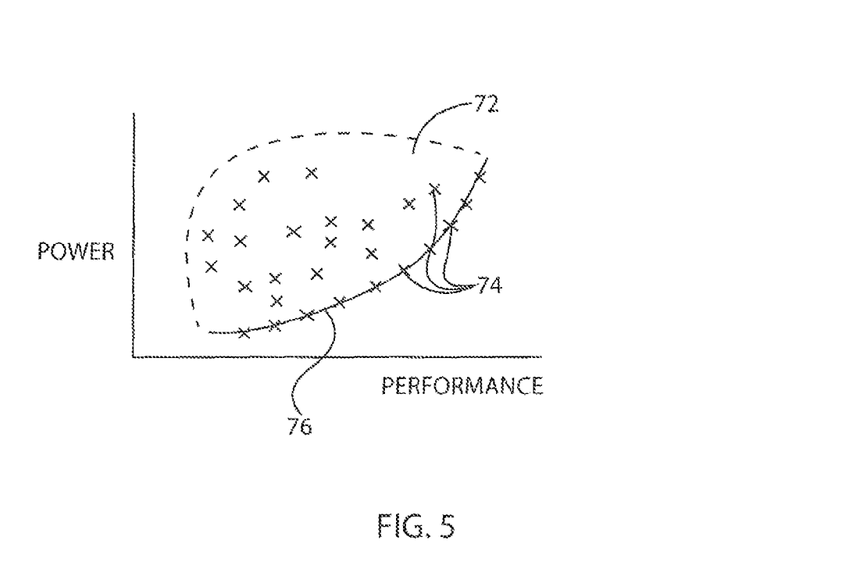
FIG. 5 is a graphic representation of a culling of the state space into the Pareto optimal boundary.

Referring now to FIG. 5, the cloud 72 of state combinations 74 calculated as described above may then be condensed to a Pareto optimal boundary 76 with respect to power usage and performance. This condensation orders each of the state combinations 74 according to the following sorting rule:

$$i<j\cdot l_i(\text{sys})<l_j(\text{sys}),\text{Power}_i(\text{sys})>\text{Power}_j(\text{sys}).$$

It will be understood generally that the boundary 76 describes state combinations 74 that are predicted to be Pareto optimal in the sense that it will not be possible to increase performance by moving from any particular state on the boundary 76 without also increasing power consumption and conversely, it will not be possible to reduce power consumption by moving from any particular point on the boundary 76 without also decreasing performance. All points in the cloud 72 above the boundary 76 are predicted to be sub-optimal (that is, Pareto-dominated) in the sense that the point on the boundary 76 that is vertically below a given point in the cloud 72 has the same performance but smaller power consumption while the point on the boundary 76 that is horizontally to the right increases performance but has the same power consumption. The boundary 76 is identified by culling Pareto-dominated points from the cloud 72. A subset of the state combinations 74 comprising the boundary 76 may be retained such that elements in the subset differ in predicted impact by at least a given margin, for example, 2% in power consumption.

The result of this process of identifying Pareto optimal state combinations 74 may be output in the form of a dashboard 79 (shown in FIG. 1) of Π-states each which represent different Pareto optimal trade-offs between performance and power. An example dashboard 79 of Π-states is shown below in Table II and shows a corresponding relative performance and relative power and the configuration name, the latter describing the constituent states of the computational resources. In reviewing the dashboard 79, for example, it will be understood that state $\Pi_3$ provides a 4% improvement in performance over state $\Pi_4$ but increases power consumption by about 7%.

TABLE II

| Π-states | Rel. Perf. | Rel. Power. | Configuration |
|---|---|---|---|
| $\Pi_0$ | 1.19 | 0.76 | P0-C4-S5-M2 |
| $\Pi_1$ | 1.14 | 0.69 | P1-C4-S5-M2 |
| $\Pi_2$ | 1.09 | 0.64 | P2-C4-S5-M2 |
| $\Pi_3$ | 1.04 | 0.58 | P3-C4-S5-M2 |
| $\Pi_4$ | 1.00 | 0.54 | P4-C4-S5-M2 |
| $\Pi_5$ | 0.96 | 0.50 | P5-C4-S5-M2 |
| $\Pi_6$ | 0.91 | 0.45 | P6-C4-S5-M2 |
| $\Pi_7$ | 0.86 | 0.42 | P7-C4-S5-M2 |
| $\Pi_8$ | 0.80 | 0.38 | P8-C4-S5-M2 |

The dashboard may be displayed on the display screen 54 shown in FIG. 1 and a particular value selected by an administrator user or the like according to user-selected goals for performance of the computer, for example a minimum performance or a maximum power consumption. The selection provides the configuration to the coordinator 56 which then controls the various computational resources to implement the associated state combination 74 so described. In particular, and referring to FIG. 3, the coordinator 56 may send a contract 81 describing a desired operating state of state combinations 74 on the dashboard 79 to each of the computational resources associated with the predictors 50. The computational resources then adjust their operating states to conform to that contract 81.

Figure 6:
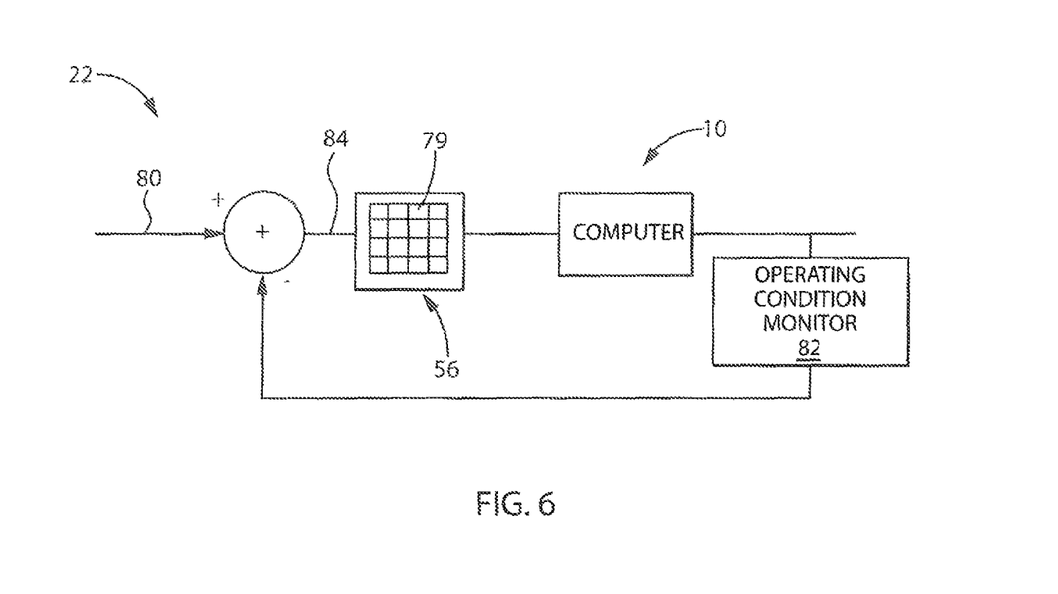
FIG. 6 is a simplified diagram of a feedback system using the Pareto optimal state space values generated by the present invention.

Referring to FIG. 6, it will be appreciated that a particular operating goal 80 may be provided to the coordinator 56, for example a "not to exceed" power number, which may be compared to a sensed power consumption value, the latter determined by an operating condition monitor 82. Results of that comparison may provide an error signal 84 used to move through the Π-state of the dashboard 79 to select a new configuration for the electronic computer 10. This feedback control process eliminates the need for constant selection of configuration states by an administrator and may be performed by the state selection state 64 of FIG. 2.

The operating goal 80 followed by the administrator or entered as a operating goal 80 need not be a simple energy or performance threshold but may look at more complex questions such as the configuration of the dashboard 79 that has the minimum energy delay ED (being a product of energy efficiency and processing time) or $ED^2$ product. Because the values of the dashboard 79 change with changing workload, different configurations may be necessary for such complex goals over time. It is also anticipated that the operating goals 80 may change, for example, being adjusted up and down according to instantaneous energy costs.

It will be understood that the various components described above can be implemented in software, discrete circuitry, or a combination of the above. For example, the coordinator 56 may be implemented as a separate discrete circuit element as opposed being executed among the cores 12 and that, to the extent the elements are executed software, this functionality can be freely moved around among cores 12 including multiple cores 12 and even the cores 12 being controlled.

Certain terminology is used herein for purposes of reference only, and thus is not intended to be limiting. For example, terms such as "upper", "lower", "above", and "below" refer to directions in the drawings to which reference is made. Terms such as "front", "back", "rear". "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

As is understood in the art, electrical power is a rate of electrical energy usage. Nevertheless these terms of electrical power consumption and electrical energy consumption should be considered to be equivalent, as used herein, to the extent that they tend to vary in tandem, except to the extent that context would require otherwise.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The multiple cores 12 may include not only general-purpose processing cores but also specialized cores, for example, for graphics processing and the like. Generally a multicore processor as used herein includes processors where different processing cores share common clock timing and thus must be operated at the same clock frequency or with synchronized clock frequencies having different multiples. The invention is not limited to multicore processors and may be used with any integrated circuit where independent supply voltage adjustment of different circuit elements may be desired after fabrication.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. An electronic computer providing dynamic power/performance management comprising:
   a set of computational resources working together to execute a stored computer program, each resource capable of operating in a set of different states providing different combinations of electrical power consumption and speed of execution of a portion of a stored computer program;
   predictors associated with each computational resource for monitoring the computational resource during the execution of the stored computer program to generate resource predictions describing electrical power consumption and speed of execution of a portion of the stored computer program at the different states of the computational resource; and
   a coordinator receiving the resource predictions from the predictors to:
   (1) combine the resource predictions into a set of system predictions describing electrical power consumption and speed of execution of the stored computer program by the computational resources working together at particular combinations of different states; and
   (2) output at least selected system predictions and associated combinations of different states.

2. The electronic computer of claim 1 wherein the output system predictions are Pareto optimal combinations of different states with respect to electrical power consumption and speed of execution of the electronic computer.

3. The electronic computer of claim 1 wherein the predictors provide the resource predictions, and the coordinator repeats steps (1)-(2), at multiple intervals during execution of the stored computer program.

4. The electronic computer of claim 1 wherein the output is communicated to a display for viewing by a user for entry of a selection of step (2).

5. The electronic computer of claim 1 wherein the coordinator further implements a step (3) of accepting a selection among the output an associated combination of different states to control the computational resources to adopt the selected combination of different states.

6. The electronic computer of claim 5 wherein the coordinator further implements a step (4) receiving a desired operating condition of at least one of electrical power consumption and speed of execution of the stored program and evaluating the output-selected system predictions and associated combinations of different states against the desired operating condition to provide the selection among the associated states of the selected system predictions.

7. The electronic computer of claim 1 wherein the computational resources include memory cache and the different states provide different operating sizes of memory cache.

8. The electronic computer of claim 1 wherein the computational resources include a processor and the different states provide at least one of different processor voltages and different processor clock frequencies to the processor.

9. The electronic computer of claim 1 wherein the computational resources include serial communication pairs between computational resources and the different states provide different numbers of parallel serial communication pairs between given computational resources.

10. The electronic computer of claim 1 wherein the computational resources include non-cache memory and wherein the different states provide at least one of memory voltage supply and memory clock speed provided to the non-cache memory.

11. The electronic computer of claim 1 wherein the coordinator combines the resource predictions using a model of interaction between the computational resources reflecting an effect on speed of execution for any given computational resource on a speed of execution of a different computational resource.

12. The electronic computer of claim 1 wherein the electronic computer is a multicore processor and wherein the coordinator is a program stored in non-transient media executing on at least one core.

13. The electronic computer of claim 12 wherein the electronic computer is a multicore processor and wherein the coordinator is a program that is executed on a designated service processor.

14. The electronic computer of claim 1 wherein the computational resources are elements of multiple different processors.

15. The electronic computer of claim 1 wherein the predictors are nonintrusive to generate resource predictions without modification of the execution of the stored program.

16. A method of operating an electronic computer having:
a set of computational resources working together to execute a stored computer program, each resource capable of operating in a set of different states providing different combinations of electrical power consumption and speed of execution of a portion of a stored computer program;
predictors associated with each computational resource for monitoring the computational resource during the execution of the stored computer program to generate resource predictions describing electrical power consumption and speed of execution of a portion of the stored computer program at the different states of the computational resource; and
a coordinator receiving the resource predictions from the predictors to:
(1) combine the resource predictions into a set of system predictions describing electrical power consumption and speed of execution of the stored computer program by the computational resources working together at particular combinations of different states; and
(2) output at least selected system predictions and associated combinations of different states, the method comprising the steps of:
(a) executing a workload program on the computational resources;
(b) generating resource predictions by the predictors for different states of each computational resource;
(c) combining the generated resource predictions into a set of system predictions each describing electrical power consumption and speed of execution of the workload program for the computational resources working together at different combinations of different states; and
(d) outputting at least some of the system predictions linked to given different combinations of the different states associated with the system predictions.

* * * * *